United States Patent [19]
Imai et al.

[11] Patent Number: 5,338,054
[45] Date of Patent: Aug. 16, 1994

[54] CART FOR HAND BAGGAGE

[75] Inventors: Hisato Imai, Shinjuku; Sadayori Mori, Toride, both of Japan

[73] Assignee: Totex Corporation, Saitama, Japan

[21] Appl. No.: 13,083

[22] Filed: Feb. 3, 1993

[30] Foreign Application Priority Data

Feb. 6, 1992 [JP] Japan .................. 4-056213
Dec. 16, 1992 [JP] Japan .................. 4-354393

[51] Int. Cl.$^5$ .............................. B62B 1/04
[52] U.S. Cl. .................. 280/655; 280/47.26; 280/47.28
[58] Field of Search ............ 280/639, 35, 638, 651, 280/652, 654, 655, 47.17, 47.18, 47.19, 47.24, 47.26, 47.27, 47.28, 47.29

[56] References Cited

FOREIGN PATENT DOCUMENTS 52-27804  6/1977  Japan .
3-40693   8/1991  Japan .
57398     3/1984  Taiwan .

*Primary Examiner*—Richard M. Camby
*Attorney, Agent, or Firm*—Oliff & Berridge

[57] ABSTRACT

A cart is provided for hand baggage and includes a baggage receiving frame, right and left main handle arms, right and left wheels, and an axle. Lateral supporting frames are provided and projected backwardly from respective upper portions of said right and left main handle arms in a direction opposite the baggage receiving frame. The projected length of the lateral supporting frames is longer than a distance between the axle and an imaginary line connecting rearmost ends of outer peripheries of the wheels. Obliquely supporting frames extend from respective rear portions of the lateral supporting frames toward the axle, and are connected to a stationary member of the baggage receiving frame. Obliquely supporting frames have respective lower portions located near the imaginary line connecting the rearmost ends of the outer peripheries of the wheels. The lateral supporting frames are connected to the respective right and left main handle arms and the respective obliquely supporting frames such that the lateral supporting frames are movable between a first position and a second position. In a first position, the obliquely supporting frames are located near the respective main handle arms. In a second position, the obliquely supporting frames are separated apart from the respective right and left main handle arms.

6 Claims, 15 Drawing Sheets

CART FOR HAND BAGGAGE

BACKGROUND OF THE INVENTION invention relates to an improvement in a small-sized cart for transporting a hand baggage such as a portmanteau or the like.

A conventional small-sized cart for transporting a hand baggage such as a suitcase is known as disclosed in Japanese Utility Model Publication Hei No. 3-4069. When ascending or descending stairs in, for example, a station, such the cart is inconvenient since the cart must be brought up and down at each stairs.

In order to eliminate the inconvenience of the cart, a gliding unit disclosed in Japanese Utility Model Publication Sho No. 52-27804, a crawled type, and a 3-wheeled structure in which right and left wheels and an axle are disposed at vertexes of a triangle have been proposed.

In the sliding unit disclosed in Japanese Utility Model Publication Sho No. 52-27804, it is necessary to pull or push a handle of a small-sized cart to move the gliding leg bodies along the ridges of the respective stairs by bending a human body who carries the cart to be easily fatigued. The crawled type and the 3-wheeled structure are large-sized and not adapted for portability at the time of a trip.

Also, proposed is a conventional cart in which a lateral supporting frame is extended rearward from the vicinity of an axle and an oblique supporting frame is extended from the rear end of the lateral frame toward the main post of a handle. The lateral supporting frame and the obliquely supporting frame are provided to prevent the cart from overturning rearward and to reinforce the mounting section of a baggage receiving base at a handle main post, and thus the cart cannot absorb a stair difference when ascending or descending the stairs.

SUMMARY OF THE INVENTION

It is an object of this invention to provide a cart for hand baggage which can be portable in a small size at the time of a trip, can be pulled up and down while gliding at the ridge of a stair as in a normal walking attitude when ascending or descending the stairs in a building or the like in a simple structure and relatively light weight.

In order to solve the above-described subject, this invention provides a cart for a hand baggage comprising a baggage receiving frame, right and left main handle arms, right and left wheels, and an axle wherein lateral supporting frames are provided and projected backwardly from respective upper portions of said right and left main handle arms in a direction opposite to the baggage receiving frame, projected length of the lateral supporting frames is longer than a distance between the axle and an imaginary line connecting rearmost ends of outer peripheries of the wheels, obliquely supporting frames extend from respective rear portions of the lateral supporting frames toward the axle, and are connected to a stationary member of the baggage receiving frame, said obliquely supporting frames have respective lower portions located near the imaginary line connecting the rearmost ends of the outer peripheries of the wheels, and said lateral supporting frames are connected to the respective right and left main handle arms and the respective obliquely supporting frames such that the lateral supporting frames are movable between a first position where said obliquely supporting frames are located near the respective main handle arms and a second position where the obliquely supporting frames are separated apart from the respective right and left main handle arms.

According to the above described present invention, by a single operation of moving the lateral supporting frames from the first position to the second position, the lateral supporting frames of the cart are projected backward from the respective right and left main handle arms, the obliquely supporting frames are moved to have an attitude extended from the end portion of the lateral supporting frames toward the axle, the projected length of the lateral supporting frames is longer than a distance between the axle and an imaginary line connecting rearmost ends of outer peripheries of the wheels, and the lower portions of the obliquely supporting frames are positioned near the imaginary line. Thus, when ascending or descending stairs, by only tilting the cart with an ordinary walking attitude, the obliquely supporting frames successively contact with the ridge of the stairs so that the cart can be smoothly moved upward or downward along stairs without any impact.

By only single operation in which the lateral supporting frames are moved from the first position to the second position, the cart has an attitude in which tile cart can smoothly ascend or descend stairs. In addition, by only single operation in which the lateral supporting frames are moved from the second position to the first position, the cart has a folded attitude in which the lateral supporting frames and the obliquely supporting frames are positioned near the right and left main handle arms. Thus, the cart according to the invention is very convenient without a complex operation.

In another aspect of the invention, the lateral supporting frames are rotatably connected at the both ends to the respective right and left main handle arms and the respective obliquely supporting frames, and further includes respective joint sections at the middle thereof around which they may be rotated vertically for folding or extending, and also includes respective stoppers for holding the projected attitude of the lateral supporting frames. With such construction, by merely rotating the front and rear frames around the joint section so that the lateral supporting frame has a straight attitude, the cart can be so modified as to be smoothly moved up or down along the stairs without any impact to the human. Also, by merely rotating the front and rear frames around the joint section, the cart can be modified to be compact. In addition, since the cart does not include a member detachable from the other member, the cart is stoutly constructed. The cart comprises only lateral supporting frames, obliquely supporting frames, and a rotatably connecting portion of lateral supporting frames and obliquely supporting frames, the cart has light weight.

In another aspect of the present invention, the lateral supporting frame consists of a single frame. The lateral supporting frame is rotatably connected to an upper portion of the obliquely supporting frame at one end. At the other end, the lateral supporting frame is connected to a short sleeve slidably movable on the main handle arm. The short sleeve is slidably connected to the main handle arm such that the short sleeve is movable between a lower position where the lateral supporting frames and the obliquely supporting frames are located near the respective right and left main handle arms and an upper position where the lateral supporting frames are projected backwardly and the obliquely supporting frames are tilted and located apart from the respective right and left main arms. Since the lateral supporting frame consists of a single frame and the end of the lateral supporting frame is rotatably connected to the short sleeve slidably on the main arm, the cart has a simple construction and is further stoutly constructed.

In still another aspect of the present invention, ends of the lateral supporting frames are rotatably connected to upper portions of the main handle arms, and lower ends of the obliquely supporting frames are detachably connected to the axle of stationary member of the baggage receiving frame. Alternatively, ends of the lateral supporting frames may be detachably connected to upper portions of the main handle arms, and lower ends of the obliquely supporting frames may be rotatably connected to the axle.

In still another aspect of the invention, right-side components of the lateral supporting frame and the obliquely supporting frame and left-side components of the lateral supporting frame and the obliquely supporting frame are foldable between the right and left main handle arms.

In still another aspect of the invention, coupling portions of said lateral supporting frames to said obliquely supporting frames are rotatable around a horizontal shaft perpendicular to said lateral supporting frames, and either one of securing portions of said lateral supporting frames to said main handle arms and securing portions of said obliquely supporting to securing portions of stationary member of the baggage receiving frame is are rotatable around a shaft parallel to said horizontal shaft, and the other securing portions are detachable.

According to these aspects of the present invention, the lateral supporting frames and the obliquely supporting frames projected rearwardly are folded flatly. Therefore, the cart can be folded in a compact state at the time of no use, thereby providing convenient portability and storage.

These and other objects and features will become more apparent from the following description of the preferred embodiments of the present invention when read in connection with the accompanying drawings.

DESCRIPTION OF THE PREFERRED EMBODIMENTS

Figure 3:
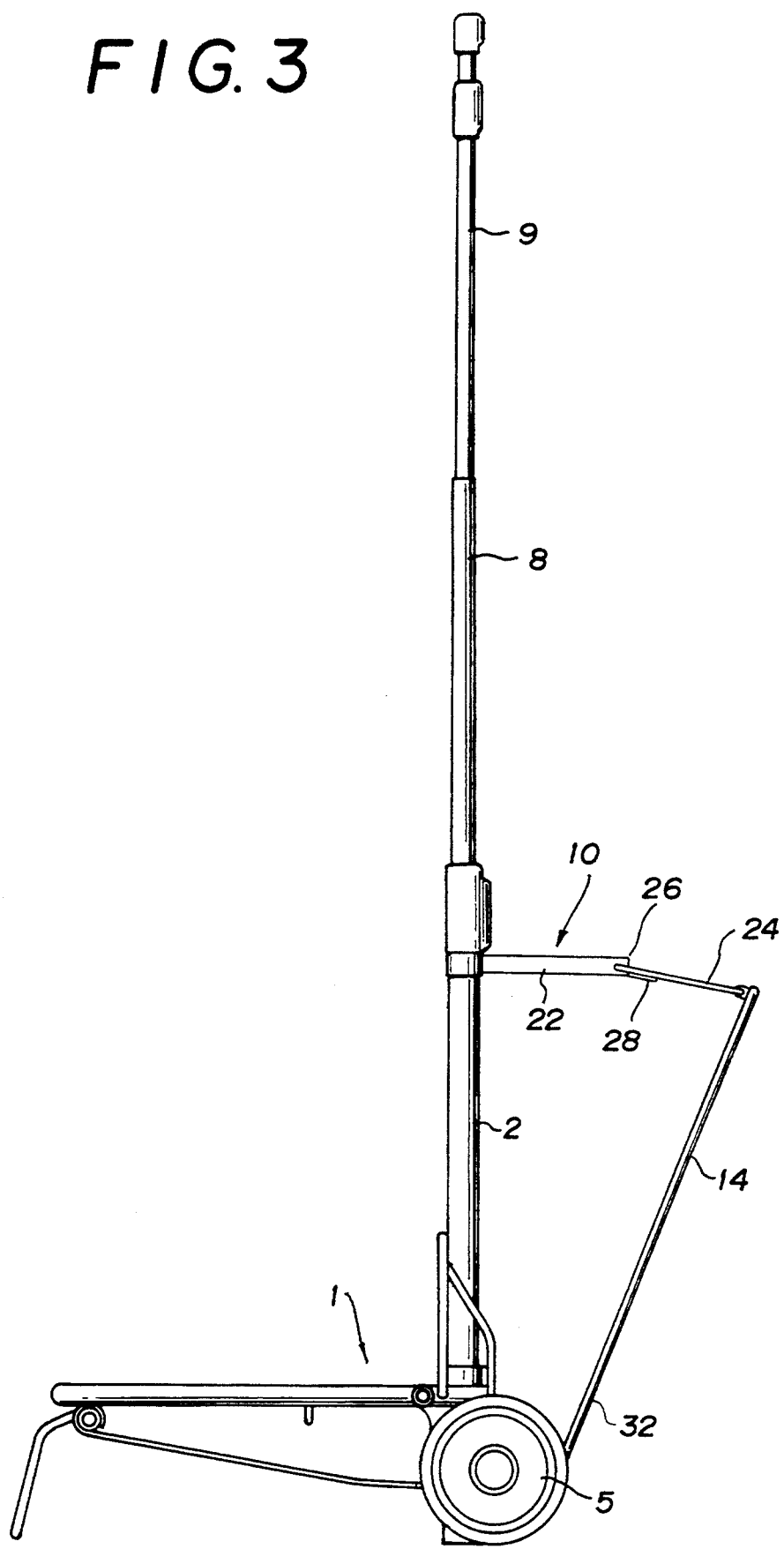
FIG. 3 is a side view of the first embodiment.
Figure 4:
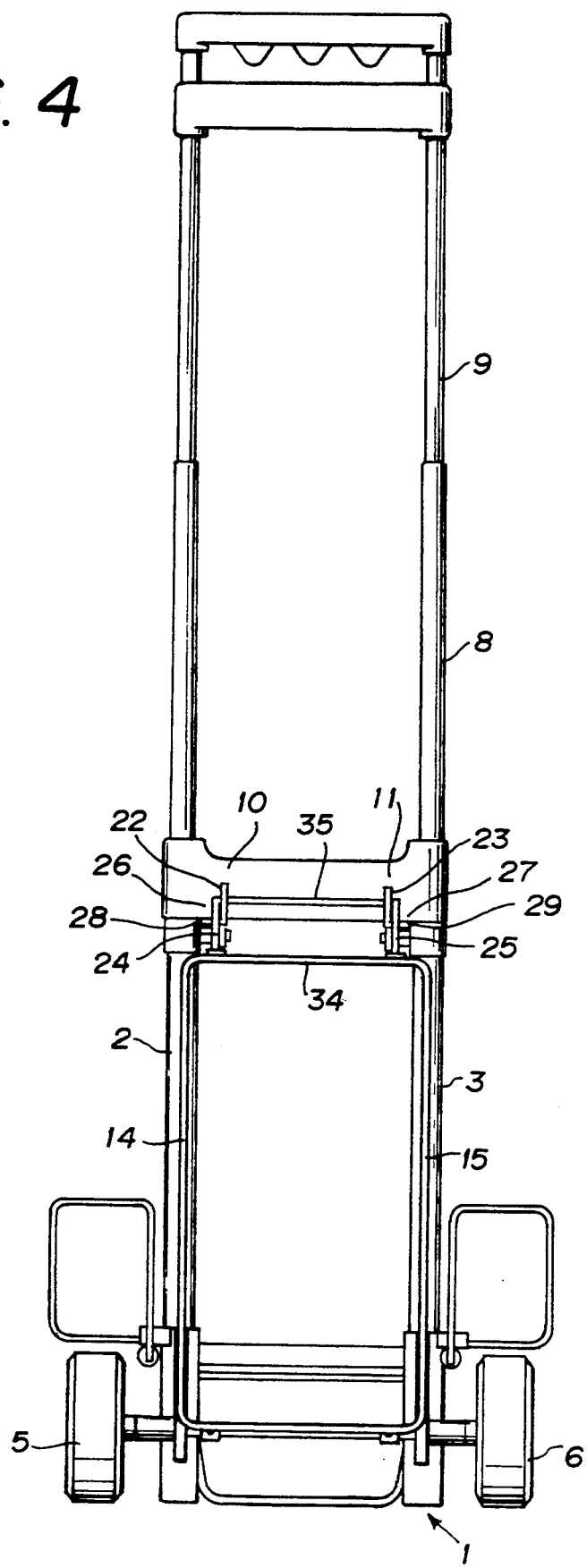
FIG. 4 is a back view of the first embodiment.
Figure 5:
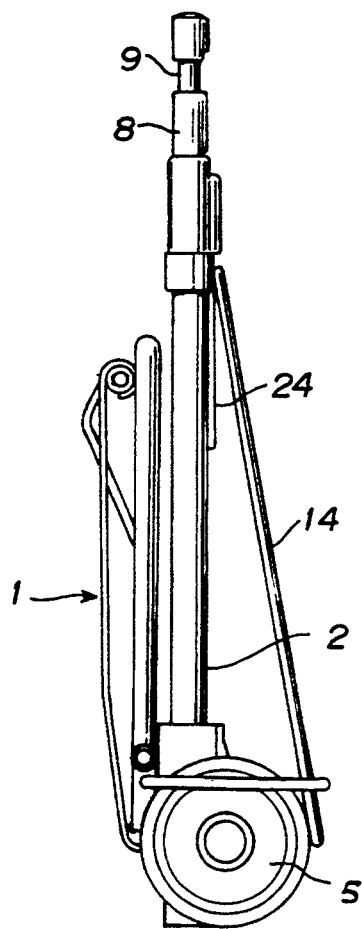
FIG. 5 is a side view of a holding state of the first embodiment.

FIGS. 1 to 6 illustrate an embodiment of a baggage carrying cart 1 of the invention. FIGS. 1 to 4 and 6 show different views of the cart 1 when it is in use. FIG. 5 shows a view of the cart 1 when it is not in use.

Figure 1:
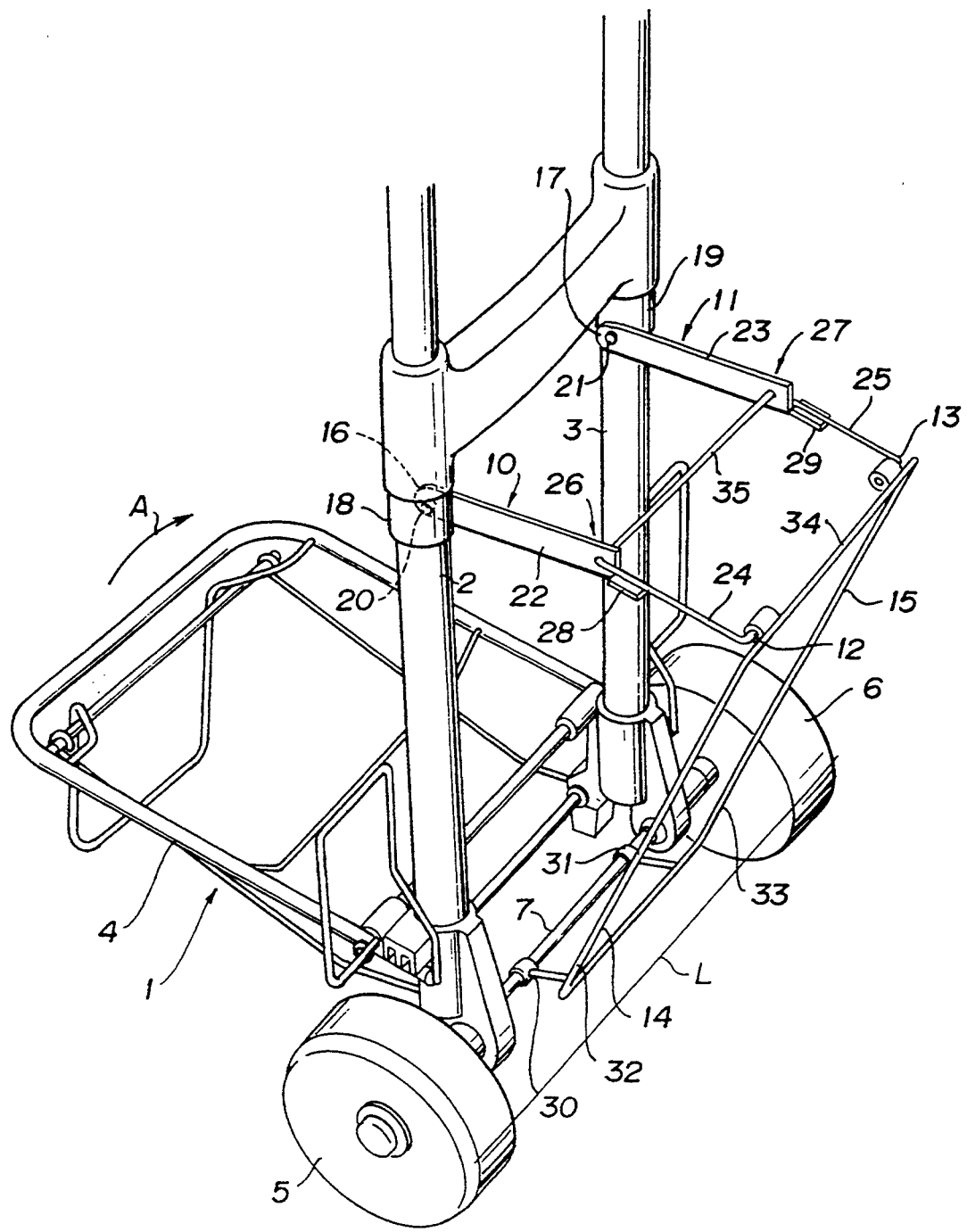
FIG. 1 is a perspective view of a main portion of the first embodiment of a cart for a hand baggage according to the present invention.

The cart 1 comprises right and left main handle arms 2 and 3, a baggage receiving frame 4 pivoted and rotatable on the handle arms 2, 3 as indicated by arrow A in FIG. 1, and a axle 7 disposed behind the baggage receiving frame 4, to which wheels 5, 6 are rotatably fitted.

The right and left main handle arms 2, 3 are hollow and telescopically contains respective extension arms 8, 9 that can move between an extended position as shown in FIGS. 3 and 4 and retracted position as illustrated in FIG. 5.

Since the pivot mechanism of the baggage receiving frame 4 and the structure of the extension arms are known, they are not illustrated in detail here.

A pair of lateral supporting frames 10, 11 projects backward, or in a direction opposite to the baggage receiving frame 4, from respective upper positions of the main handle arms 2, 3. Each of lateral supporting frames 10, 11 has a length longer than a distance between the axle 7 and an imaginary line L connecting the rearmost ends of the outer peripheries of the wheels 5, 6.

Said lateral supporting frames 10, 11 are rotatably connected to respective obliquely supporting frames 14, 15 at respective rear ends 12, 13 of the lateral supporting frames 10, 11. Said lateral supporting frames 10, 11 are rotatably fitted to sleeves 18, 19 by pivots 20, 21. The sleeves 18, 19 are rigidly fitted to the respective upper portions of the right and left main handle arms 2, 3.

The lateral supporting frames 10, 11 respectively comprise front frames 22, 23 and rear frames 24, 25. Each of the rear frames 24, 25 is pivotally connected to the respective front frames 22, 23 at respective joint sections 26, 27 at the middle of the lateral supporting frames 10, 11 so that the rear frames 24, 25 may be vertically swingable around respective joint sections 26, 27.

At said joint sections 26, 27, stoppers 28, 29 are provided and extended from the rear ends of the front frames 22, 24. The stoppers 28, 29 receive the lower surfaces of the corresponding respective front ends of the rear frames 24, 25. When the rear frames 24, 25 are turned downward, the front ends of the rear frames 24, 25 abut against the respective stoppers 28, 29 at the respective joint sections 26, 27 and thus to prevent further downward turn of the rear frames 24, 25 so as to keep an obtuse upward angle between the front frame and the rear frame. Thus, the lateral supporting frames 10, 11 keep the backwardly projected attitude.

Referring to FIGS. 1 and 3, if the joint sections 26, 27 are pressed downward, the lateral supporting frames 10, 11 can be easily folded at the joint sections 26, 27 so that the cart may take a posture as shown in FIG. 5, where the front frames 22, 23 are superposed on the respective rear frames 24, 25.

Said obliquely supporting frames 14, 15 extend downward from the respective rear ends 12, 13 of the lateral supporting frames 10, 11 toward the axle 7 and rotatably fitted to a stationary member of tile baggage receiving frame 4 side, for example, to the axle 7 at respective lower ends 30, 31 in the illustrated embodiment.

Lower portions 32, 33 of the obliquely supporting frames 14, 15 are located near said imaginary line L.

Figure 2:
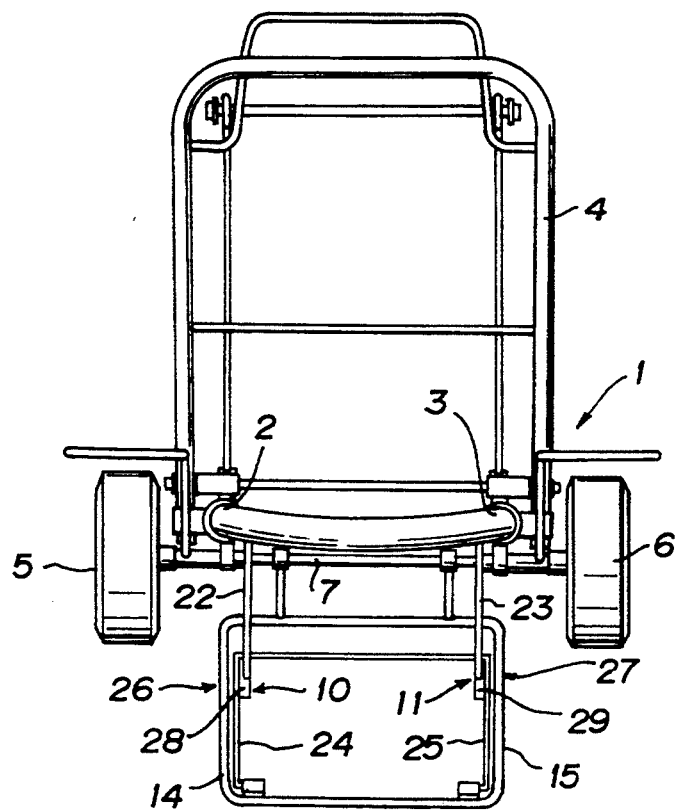
FIG. 2 is a plan view of the first embodiment.

When the joint sections 26, 27 are pressed downwardly, the obliquely supporting frames 14, 15 are moved to superpose the front frames 22, 23 on the rear frames 24, 25 as illustrated in FIG. 5. A first position is a position where the obliquely supporting frames 14, 15 are positioned near the main handle arms 2, 3 as illustrated in FIG. 5. A second position is illustrated in FIGS. 2, 3 and 4.

While the right and left obliquely supporting frames 14, 15 are connected by a lateral rod 34 and the right and left rear frames 24, 25 of the lateral supporting frames 10, 11 are connected by a lateral rod 35 in the illustrated embodiment, the invention is not limited to such construction.

Figure 6:
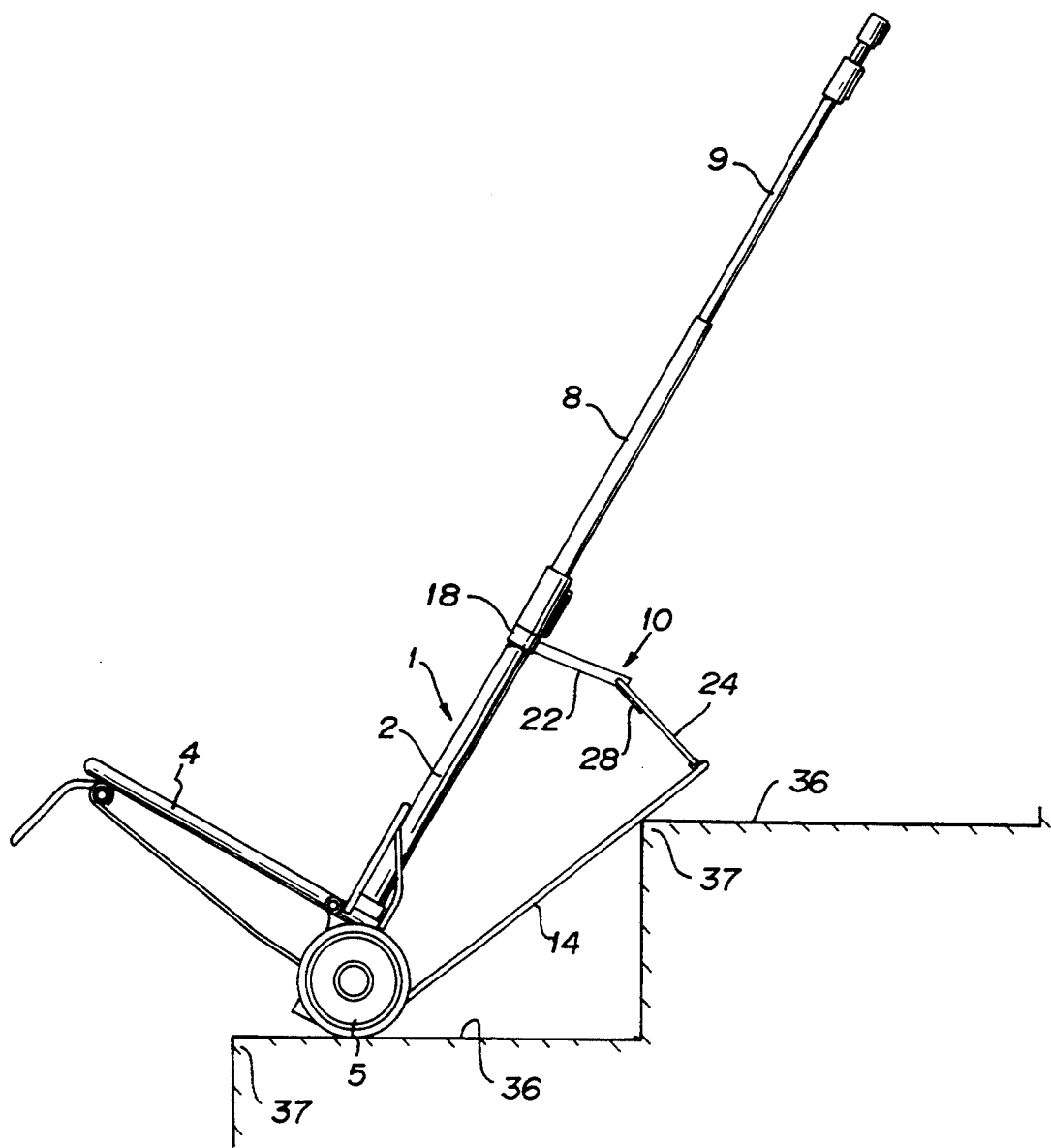
FIG. 6 is a schematic side view showing the state at the time of ascending and descending at the stairs of the first embodiment.

FIG. 6 illustrates the state at the time of ascending and descending at stairs 36 of the cart 1 in which the lateral supporting frames 10, 11 are extended rearward and the obliquely supporting frames 14, 15 are held to tilt.

If the weight of baggage (not shown in FIG. 6) is loaded to the obliquely supporting frames 14, 15 contacted with ridge 37 of the stairs 36, the rear frames 24, 25 contact with the stoppers 28, 29 of the front frames 22, 23 so as to prevent the further downward turn of the joint sections 26, 27. In addition, no force is applied to the joint sections 26, 27 to press them downward. Thus, the obliquely supporting frames 14, 15 are slid on the ridge 37 and thus the cart 1 is slid on the stairs 36.

After the cart 1 passes through the stairs, the lateral supporting frames 10, 11 are bent and folded as described above so that the cart can be compactly and conveniently moved on a flat floor.

Figure 7:
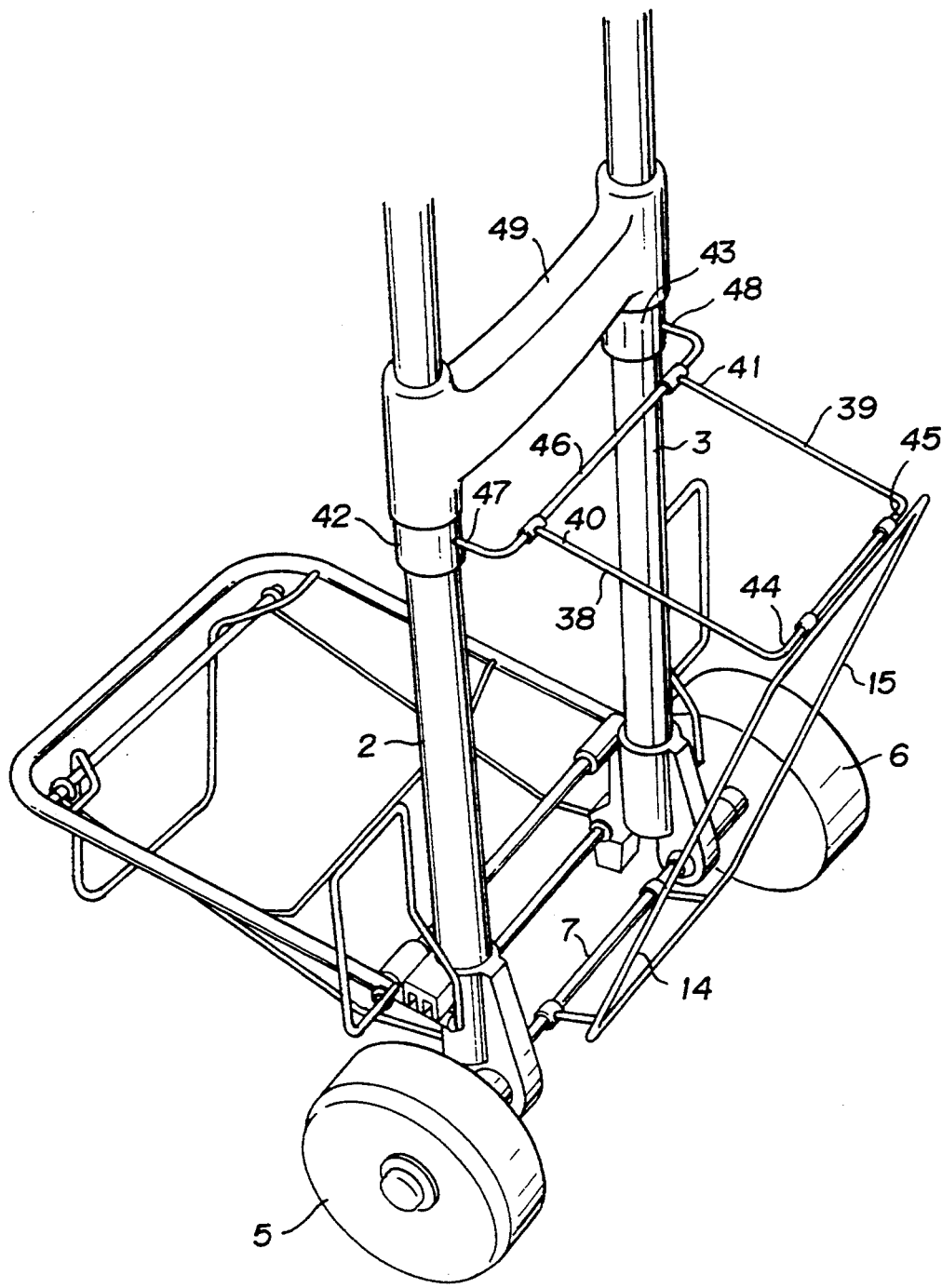
FIG. 7 is a perspective view of a .main portion of the second embodiment of a cart for a hand baggage according to the present invention.
Figure 8:
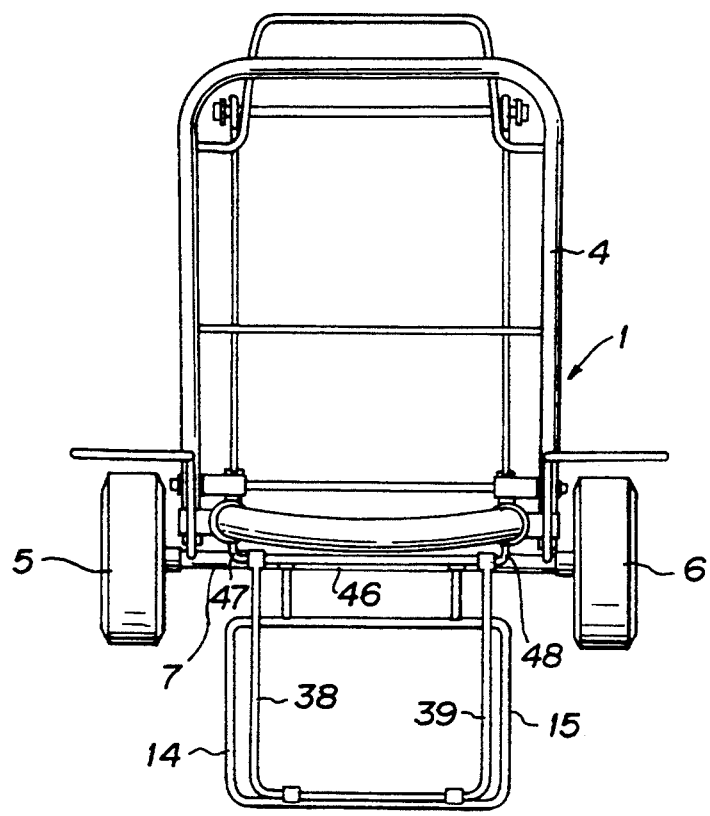
FIG. 8 is a plan view of the second embodiment.

FIGS. 7 to 10 illustrate another embodiment of the present invention. This second embodiment is different from the above described first embodiment only in the following two points. Each of lateral supporting frames 38, 39 consists of single frame. Short sleeves 42, 43 are rigidly fitted to respective ends 40, 41 of the lateral supporting frames 38, 39 and are slidably movable on the respective right and left main handle arms 2, 3. Other components except the above two components are identical with those of the first embodiment and thus are indicated by the identical numerals. As Illustrated in FIG. 7, the lateral supporting frames 38, 39 are rotatably connected at ends 44, 45 thereof to the respective upper portions of the obliquely supporting frames 14, 15.

Other ends 40, 41 of the lateral supporting frames 38, 39 are rotatably connected to a lateral rod 46. Both ends 47, 48 are rigidly fitted to the respective short sleeves 42, 43.

Figure 9:
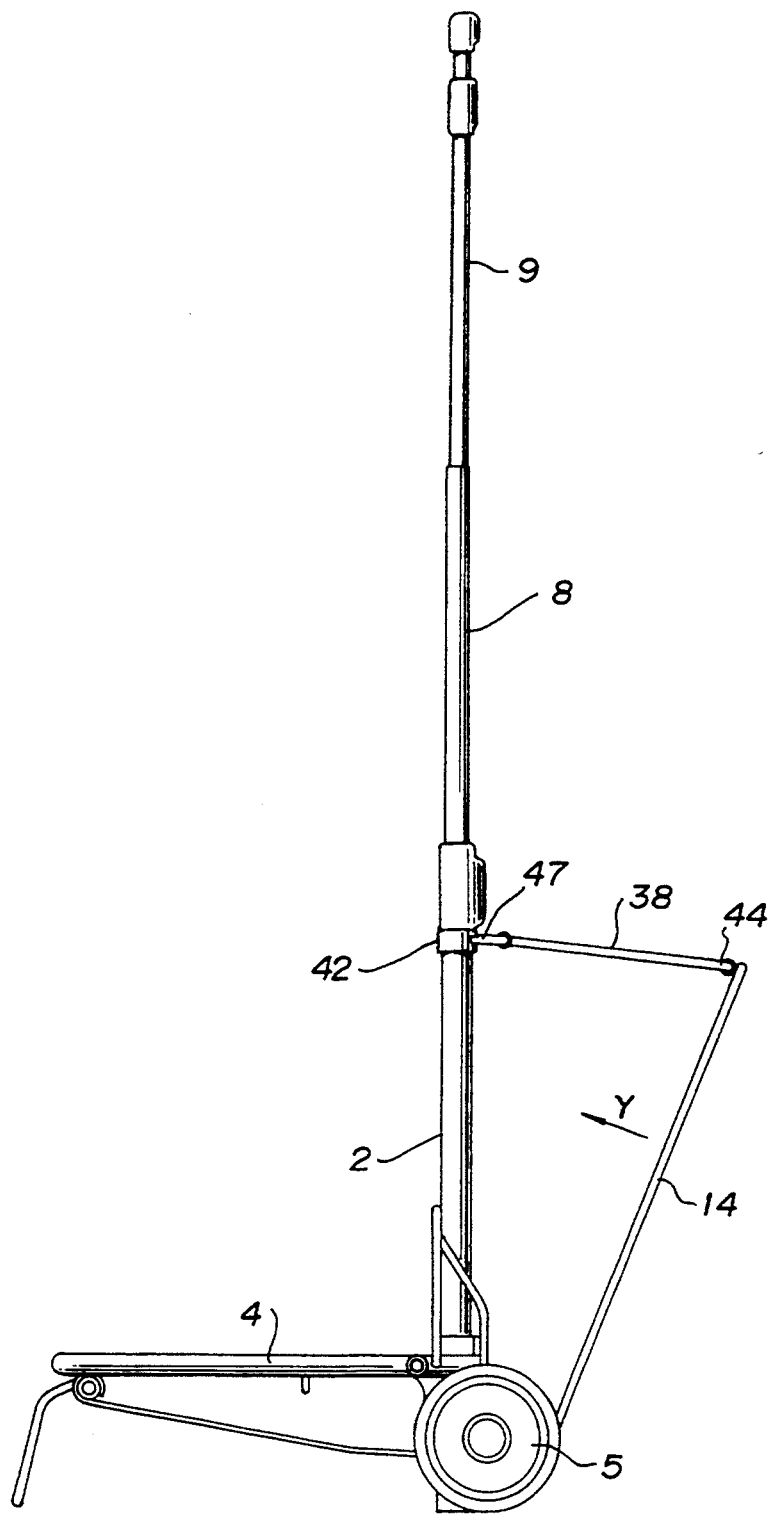
FIG. 9 is a side view of the second embodiment.

As seen from FIGS. 7 and 9, when the short sleeves 42 and 43 are positioned at an upper position where the short sleeves 42 and 43 contact with a lateral handle arm 49 at the upper ends of the main handle arms 2 and 3, the lateral supporting frames 38 and 39 connected to the respective obliquely supporting frames 14 and 15 are protruded rearwardly so as to keep the obliquely supporting frames 14 and 15 in an inclined attitude directed toward the axle 7.

Figure 10:
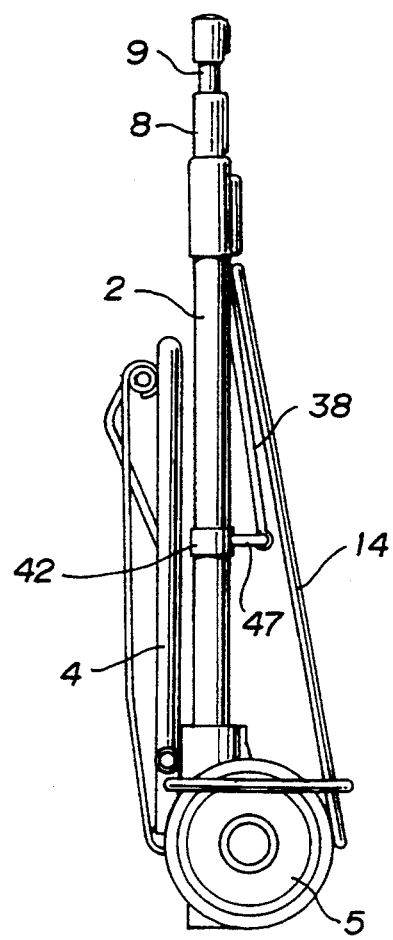
FIG. 10 is a side view of a folding state of the second embodiment.

When, to the contrary, the short sleeves 42, 43 are moved downwardly along the main handle arms 2 and 3 to position them at a lower position, the lateral supporting frames 38, 39 and the obliquely supporting frames 14, 15 are located closer to the respective main handle arm 2, 3 as illustrated in FIG. 10.

The cart of the second embodiment can ascend or descend the stairs by sliding the obliquely supporting frames 14, 15 on the ridge 37 of the stairs 36 as illustrated in FIG. 6. The ridge 37 pushes the obliquely supporting frames 14 and 15 as indicated by arrow Y in FIG. 9 and no force is applied to the short sleeve 42 and 43 to pull them down. Thus, tile cart 1 can conveniently ascend or descend along the stairs as in the case of the first embodiment illustrated in FIGS. 1 to 6.

The lower position of the short sleeves 42 and 43 is recognized as the first position of the lateral supporting frames 38 and 39. The upper position of the short sleeves 42 and 43 is recognized as the second position of the lateral supporting frames 38 and 39.

FIGS. 11 to 17 Illustrate further another embodiment of the present invention.

In this embodiment, each of lateral supporting frames 51 and 52 is also constructed as one component.

In the embodiment as shown, ends of the lateral supporting frames 51 and 52 are pivotally secured to brackets 53 and 54 fixedly secured to the upper portions of the main handle arms 2 and 3. The ends of the lateral supporting frames 51 and 52 are rotatably secured at rotational shafts 55 and 56 of horizontal shafts perpendicular to tile lateral supporting frames 51 and 52.

Obliquely supporting frames 57 and 58 are extended from rear portions of the lateral supporting frames 51 and 52 toward the axle 7.

In the embodiment as shown, upper ends of the obliquely supporting frames 57 and 58 are rotatably supported to brackets 61 and 62 of the lateral supporting frames 51 and 52 at horizontal shafts 59 and 60 perpendicular to the lateral supporting frames 51 and 52.

The brackets 53 and 54 fixedly secured to the upper portions of the main handle arms 2 and 3 are formed with stopper pieces 63 and 64 protruding rearward. Connecting portions 65 and 66 of downward openings are formed at the lateral supporting frames 51 and 52, and contact with the stopper pieces 63 and 64. Thus, when the connecting portions 65 and 66 are externally engaged with the stopper pieces 63 and 64 while the lateral supporting frames 51 and 52 are disposed in horizontal attitudes, the horizontal attitudes of the lateral supporting frames 51 and 52 are maintained (the second position).

Lower portions of the obliquely supporting frames 57 and 58 are slightly inwardly bent to approach each other. Connecting spring pieces 69 and 70 are mounted at the ends 67 and 68 of the obliquely supporting frames 57 and 58. These are opened toward the baggage receiving frame 4, and detachably supported to a stationary member of the baggage receiving frame 4 side, i.e., to the axle 7 in the embodiment as shown.

Figure 14:
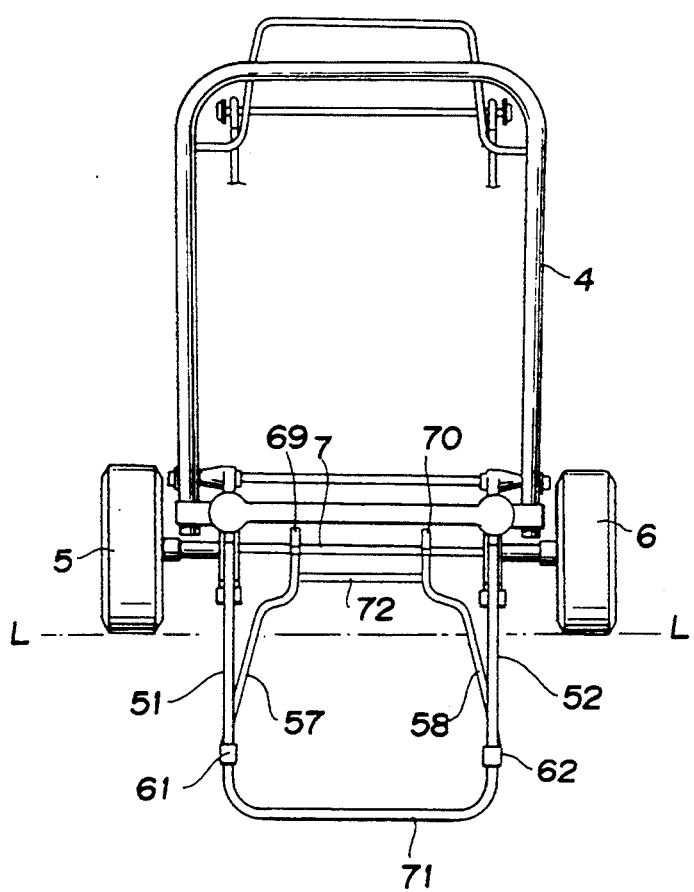
FIG. 14 is a plan view of the third embodiment.

The lateral supporting frames 51 and 52 are coupled by an operating lateral rod 71, and the obliquely supporting frames 57 and 58 are also coupled by a lateral rod 72 to reinforce the lateral supporting frames 51 and 52. As a result, the lateral supporting frames 51, 52 and the obliquely supporting frames 57, 58 protrude in an inverted conical shape rearward of the cart for the hand baggage as shown in FIGS. 11, 12 and 14.

Figure 11:
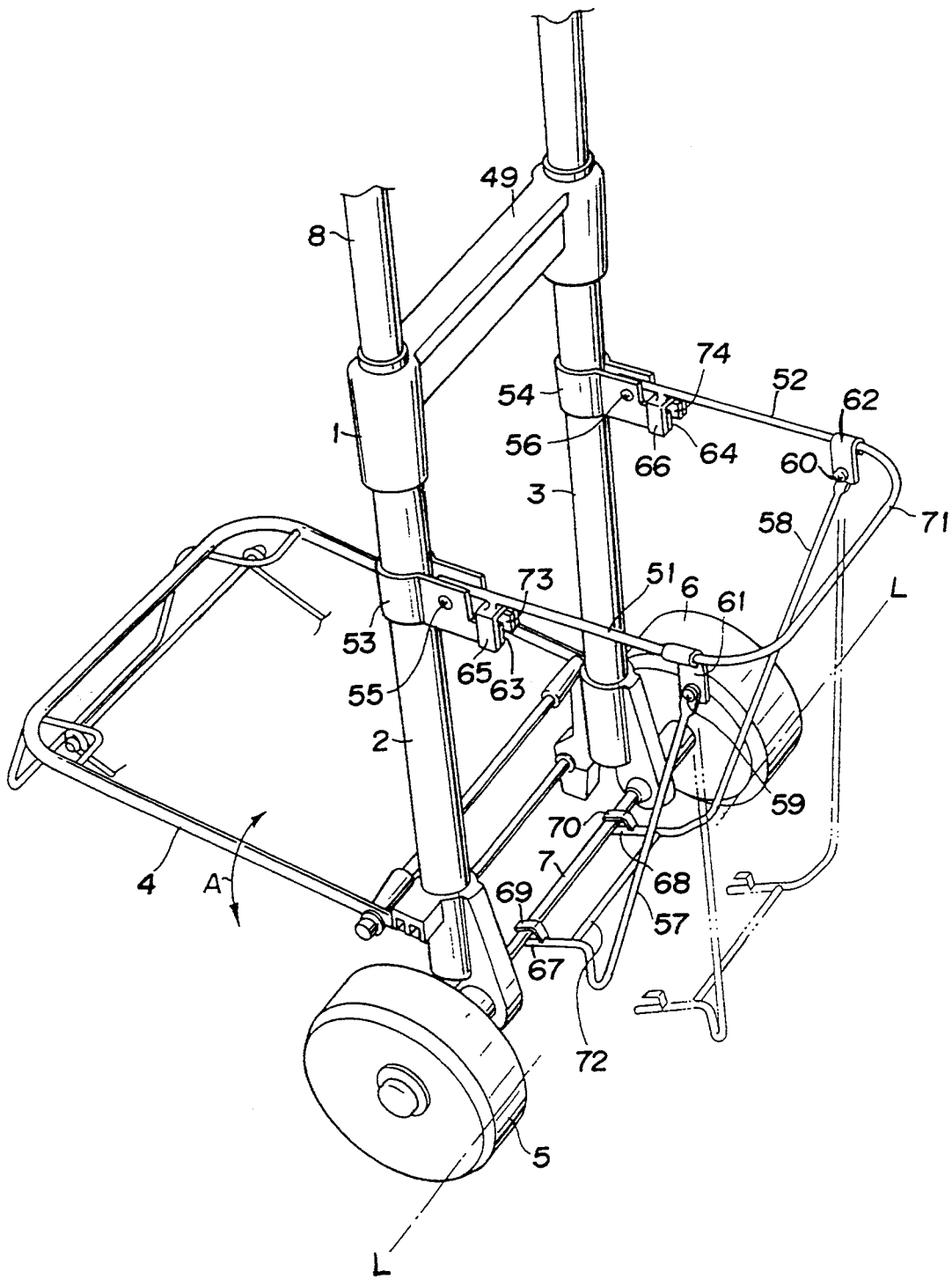
FIG. 11 is a perspective view of a main portion of the third embodiment of a cart for a hand baggage according to the present invention.
Figure 12:
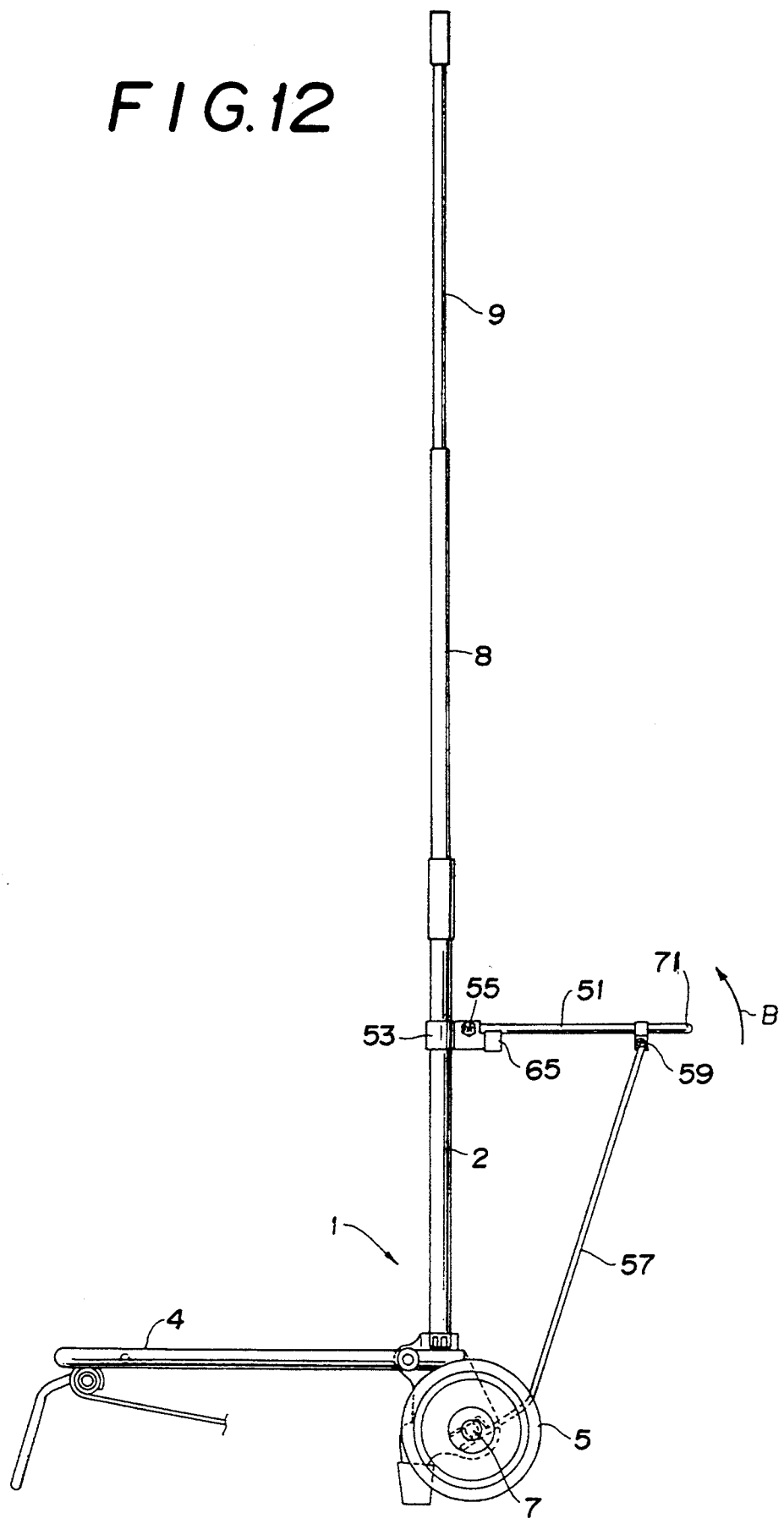
FIG. 12 is a side view of the third embodiment.
Figure 13:
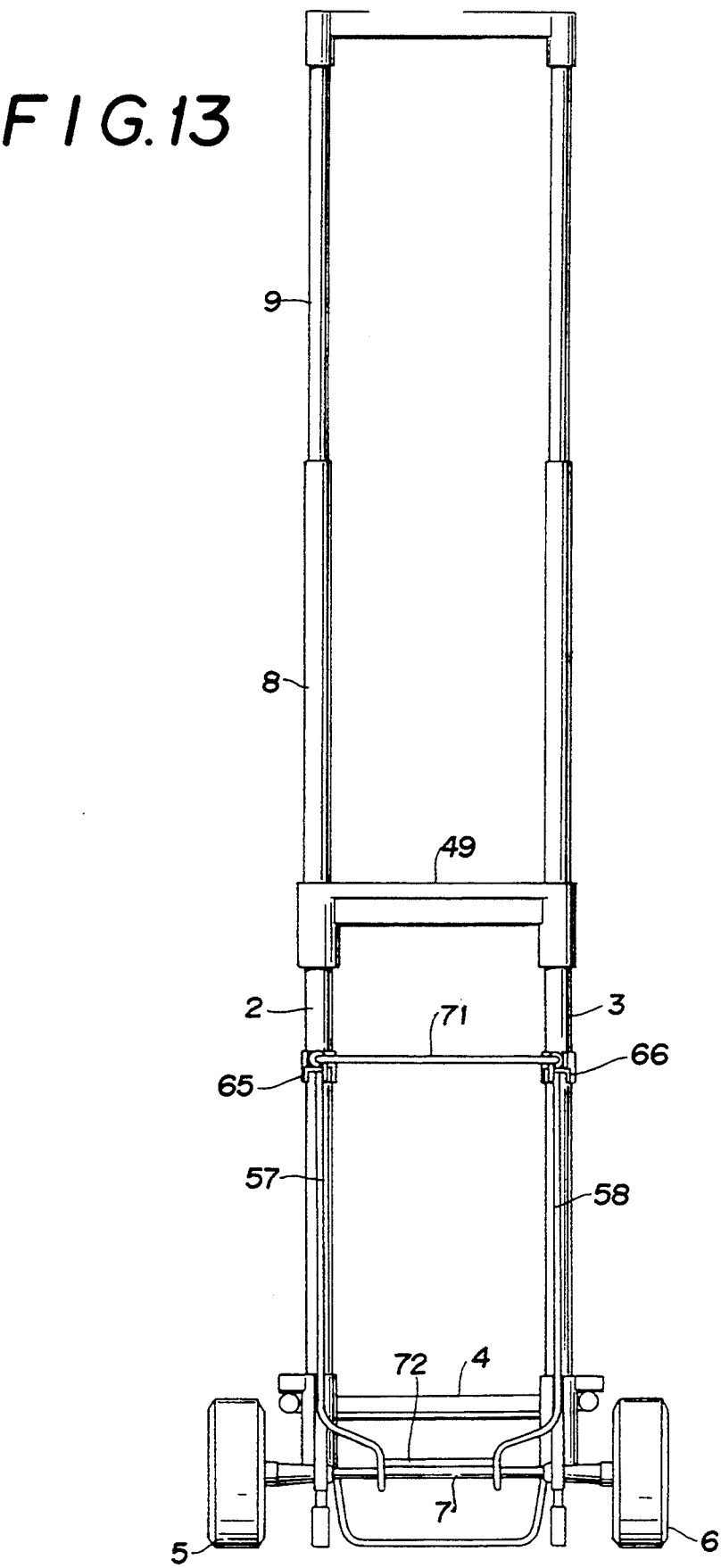
FIG. 13 is a back view of the third embodiment.
Figure 15:
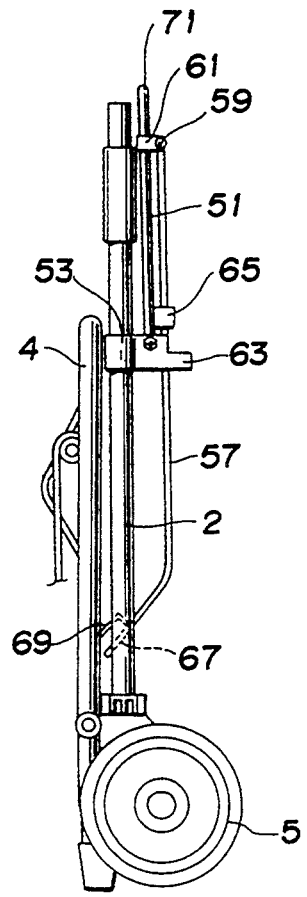
FIG. 15 is a side view of a folding state of the third embodiment.
Figure 16:
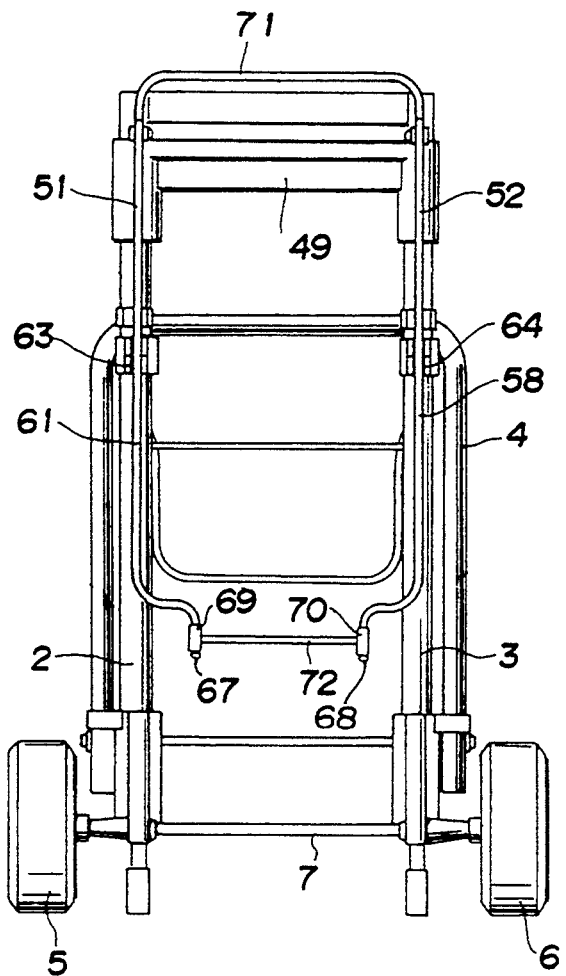
FIG. 16 is a back view of the third embodiment.
Figure 17:
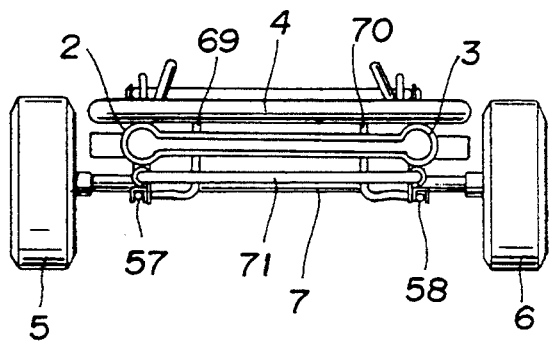
FIG. 17 is a plan view of the third embodiment.

When the obliquely supporting frames 57 and 58 are pulled rearward, the ends 67 and 68 are removed from the axle 7 to become free states as indicated by two-dotted broken lines in FIG. 11. Therefore, when tile lateral supporting frames 51 and 52 are rotated upwardly as indicated by an arrow B in FIG. 12, the lateral supporting frames 51, 52 and the obliquely supporting frames 57, 58 are folded in a vertical state to be superposed flatly as indicated in FIG. 15 (the first position).

In order to hold the flatly folded attitude of the lateral supporting frames 51, 52 and the obliquely supporting frames 57, 58, connecting portions 73 and 74 of connecting grooves for receiving the obliquely supporting frames 57, 58 in vertical attitudes are formed in the stopper pieces 63 and 64 of the brackets 53 and 54. Thus, the lateral supporting frames 51, 52 and the obliquely supporting frames 57, 58 folded in the vertical state are held in stably folded attitudes.

In the embodiment as shown, the ends of the lateral supporting frames 51 and 52 are rotatably supported to the upper portions of the main handle arms 2 and 3, and the lower ends 67 and 68 of the obliquely supporting frames 57 and 58 are detachably supported to the axle 7 of the stationary member at the baggage receiving frame 4 side. Alternatively, the ends of the lateral supporting frames 51 and 52 may be detachably supported to the upper portions of the main handle arms 2 and 3, and the ends 67 and 68 of the obliquely supporting frames 57 and 58 may be rotatably supported to the axle 7.

Still alternatively, tile lateral supporting frames 51, 52 and the obliquely supporting frames 57, 58 may not be coupled by the operating lateral rod 71, 72. In such a case, the right-side lateral supporting frame 51 is coupled with the right-side obliquely supporting frame 57, the left-side lateral supporting frame 52 is coupled with the left-side obliquely supporting frame 58, and thus the right-side components 51, 57 and the left-side components 52, 58 are separately constructed. The ends of the lateral supporting frames 51, 52 at the main handle arms 2, 3 side, and the ends 67, 68 of the obliquely supporting frames 57, 58 are horizontally rotatably supported to the main handle arms, 2, 3 and the axle 7. Thus, the right-side components of the lateral supporting frame 51 and the obliquely supporting frame 57 and the left-side components of the lateral supporting frame 52 and the obliquely supporting frame 58 may be folded between the main handle arms 2 and 3.

According to the present invention, by a single operation in which the lateral supporting frames are moved from the first position to the second position, the obliquely supporting frames become to have a tilted attitude where the obliquely supporting frames extend from the rear ends of the lateral supporting frames toward the axle. Thus, the operation is convenient.

Since the rearwardly projected length of the lateral supporting frames is longer than a distance between the axle and an imaginary line connecting rearmost ends of outer peripheries of the wheels, and since lower portions of the obliquely supporting frames are located near the imaginary line connecting the rearmost ends of the outer peripheries of the wheels, the cart can smoothly ascend and descend stairs without an impact with an ordinary walking attitude.

Since by a single operation, the extended lateral supporting frames and the obliquely supporting frames can be folded to a position close to the main handle arms, it can be easily handled for storage.

Since the cart according to the invention has no detachable element and merely necessitates the rotational operation of the lateral supporting frames at the middle of the lateral supporting frames, it can be stoutly constructed with a minimum number of elements and it has light-weight.

According another aspect of the present invention, only the slidable operation of the short sleeve by the lateral supporting frames, it can be further stoutly constructed.

What is claimed is:
1. A cart for baggage comprising:
a baggage receiving frame;
first and second main handle arms having upper portions, the baggage receiving frame being connected to the first and second main handle arms on a first side of the main handle arms;
an axle connected to the first and second main handle arms on a second side of the main handle arms opposite from the first side;
first and second wheels mounted on the axle;
lateral supporting frames projecting from the upper portions of said first and second main handle arms in a direction away from the first side of the main handle arms, a projected length of each of the lateral supporting frames being longer than a distance between the axle and an imaginary line connecting outer peripheries of the wheels on the second side of the main handle arms, the lateral supporting frames having first end portions connected to the main handle arms and second end portions opposite from the first end portions; and
obliquely supporting frames extending from the second end portions of the lateral supporting frames toward the axle, said obliquely supporting frames being rotatably connected to a stationary member on the cart, said obliquely supporting frames having lower portions located near the imaginary line, wherein the first end portions of said lateral supporting frames are rotatably connected to the first and second main handle arms and the second end portions of said lateral supporting frames are rotatably connected to the obliquely supporting frames such that the lateral supporting frames are movable between a first position where said obliquely supporting frames are located near the first and second main handle arms and a second position where the obliquely supporting frames are separated from the first and second main handle arms.

2. The cart according to claim 1, wherein each of said lateral supporting frames comprises a first and second frame pivotally connected by a joint section so that the second frame is capable of vertical rotation around the joint section for one of folding and extending, wherein stoppers are located at said joint sections for holding the extended second frames.

3. A cart for baggage comprising:
a baggage receiving frame;
first and second main handle arms having upper portions, the baggage receiving frame being connected to the first and second main handle arms on a first side of the main handle arms;
an axle connected to the first and second main handle arms on a second side of the main handle arms opposite from the first side;
first and second wheels mounted on the axle;
short sleeves slidably movable on the first and second main handle arms;

lateral supporting frames projecting from the upper portions of said first and second main handle arms in a direction away from the first side of the main handle arms, a projected length of each of the lateral supporting frames being longer than a distance between the axle and an imaginary line connecting outer peripheries of the wheels on the second side of the main handle arms, the lateral supporting frames having first end portions connected to the main handle arms and second end portions opposite from the first end portions, each of said lateral supporting frames comprising a single frame; and obliquely supporting frames extending from the second end portions of the lateral supporting frames toward the axle, said obliquely supporting frames being rotatably connected to a stationary member on the cart, said obliquely supporting frames having lower portions located near the imaginary line, said obliquely supporting frames having upper portions, wherein said second end portions of said lateral supporting frames are rotatably connected to the upper portions of said obliquely supporting frames, said first end portions of said lateral supporting frames are rotatably connected to said short sleeves, and said short sleeves are connected to the first and second main handle arms such that said short sleeves are slidably movable between a lower position where said lateral supporting frames and said obliquely supporting frames are located near the first and second main handle arms and an upper position where said lateral supporting frames are projected in the direction away from the first side of the main handle arms and said obliquely supporting frames are tilted away from the first and second main handle arms.

4. A cart for baggage comprising:
a baggage receiving frame;
first and second main handle arms having upper portions, the baggage receiving frame being connected to the first and second main handle arms on a first side of the main handle arms;
an axle connected to the first and second main handle arms on a second side of the main handle arms opposite from the first side;
first and second wheels mounted on the axle;
lateral supporting frames projecting from the upper portions of said first and second main handle arms in a direction away from the first side of the main handle arms, a projected length of each of the lateral supporting frames being longer than a distance between the axle and an imaginary line connecting outer peripheries of the wheels on the second side of the main handle arms, the lateral supporting frames having first end portions connected to the main handle arms and second end portions opposite from the first end portions, the first end portions of the lateral supporting frames being rotatably connected to upper portions of the first and second main handle arms, and obliquely supporting frames extending from the second end portions of the lateral supporting frames toward the axle, lower portions of the obliquely supporting frames being detachably connected to a stationary member on the cart, said lower portions being located near the imaginary line, wherein the first end portions of said lateral supporting frames are connected to the first and second main handle arms and the second end portions of the lateral supporting frames are connected to the obliquely supporting frames such that the lateral supporting frames are movable between a first position where said obliquely supporting frames are located near the first and second main handle arms and a second position where the obliquely supporting frames are separated apart from the first and second main handle arms.

5. The cart according to claim 4, wherein the lateral supporting frames and the obliquely supporting frames are foldable between the first and second main handle arms.

6. The cart according to claim 4, wherein the rotatable connection between said obliquely supporting frames and the second end portions of the lateral supporting frames rotates around first horizontal shafts positioned perpendicular to said lateral supporting frames, the rotatable connection between said lateral supporting frames and said first and second main handle arms rotates around second horizontal shafts positioned parallel to said first horizontal shafts.

* * * * *